(12) United States Patent  
Arai

(10) Patent No.: US 9,707,740 B2
(45) Date of Patent: Jul. 18, 2017

(54) MELAMINE RESIN DECORATIVE SHEET AND METHOD OF REFURBISHING FINISHED SURFACE

(71) Applicant: SUMITOMO BAKELITE CO., LTD., Tokyo (JP)

(72) Inventor: Kousuke Arai, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 290 days.

(21) Appl. No.: 14/382,719

(22) PCT Filed: Mar. 6, 2013

(86) PCT No.: PCT/JP2013/056113
§ 371 (c)(1),
(2) Date: Sep. 3, 2014

(87) PCT Pub. No.: WO2013/133314
PCT Pub. Date: Sep. 12, 2013

(65) Prior Publication Data
US 2015/0020952 A1     Jan. 22, 2015

(30) Foreign Application Priority Data

Mar. 7, 2012    (JP) .................................. 2012-050148
Jan. 10, 2013   (JP) .................................. 2013-002889

(51) Int. Cl.
*B29C 73/00*     (2006.01)
*B32B 43/00*     (2006.01)
(Continued)

(52) U.S. Cl.
CPC .............. *B32B 15/095* (2013.01); *B32B 5/16* (2013.01); *B32B 7/12* (2013.01); *B32B 15/08* (2013.01);
(Continued)

(58) Field of Classification Search
CPC . B44C 5/0469; B44C 5/0484; B32B 2451/00; B32B 27/04; B32B 15/04;
(Continued)

(56) References Cited

U.S. PATENT DOCUMENTS 3,589,974 A     6/1971   Albrinck et al.
2013/0273352 A1  10/2013  Nakagawa et al.

FOREIGN PATENT DOCUMENTS

EP     0819794 A2    1/1998
JP     2001-96702 A   4/2001
(Continued)

OTHER PUBLICATIONS

Yi et al. "Studies on Curing and Film Properties of Core/Shell Acrylic-Polyurethane Emulsion", Jounal of Huazhong Normal University (Nat. Sci.), vol. 42, No. 1, Mar. 2008, pp. 72-76, cited in Chinese Office Action dated May 27, 2015, w/English Abstract (5 pages).

(Continued)

*Primary Examiner* — Philip Tucker
*Assistant Examiner* — Brian R Slawski
(74) *Attorney, Agent, or Firm* — Westerman, Hattori, Daniels & Adrian, LLP

(57) ABSTRACT

A melamine resin decorative sheet of the present invention includes a laminate structure of a surface layer and a core layer, in which the surface layer is configured of a surface layer material composed of a surface layer base material which carries a resin containing a melamine resin on a first surface side that serves as a design surface and which carries a solid content of a thermoplastic emulsion resin on a second surface side that contacts with the core layer, and in which the core layer is configured of a heat dissipative material layer.

15 Claims, 3 Drawing Sheets

(51) Int. Cl.
| | |
|---|---|
| B29C 65/00 | (2006.01) |
| B32B 27/00 | (2006.01) |
| B32B 37/00 | (2006.01) |
| D21H 11/00 | (2006.01) |
| B32B 7/12 | (2006.01) |
| B32B 5/22 | (2006.01) |
| B32B 5/16 | (2006.01) |
| B32B 15/04 | (2006.01) |
| B32B 15/00 | (2006.01) |
| B32B 17/06 | (2006.01) |
| B32B 17/08 | (2006.01) |
| B32B 23/04 | (2006.01) |
| B32B 23/22 | (2006.01) |
| B32B 29/00 | (2006.01) |
| B32B 15/095 | (2006.01) |
| B32B 15/08 | (2006.01) |
| B32B 27/42 | (2006.01) |
| B32B 15/16 | (2006.01) |
| B32B 27/08 | (2006.01) |
| B32B 15/098 | (2006.01) |
| B32B 15/20 | (2006.01) |
| B32B 27/16 | (2006.01) |
| B32B 27/20 | (2006.01) |
| B32B 37/18 | (2006.01) |
| B44C 1/10 | (2006.01) |
| B44C 5/04 | (2006.01) |
| B32B 15/12 | (2006.01) |
| B32B 27/04 | (2006.01) |
| B32B 38/06 | (2006.01) |

(52) U.S. Cl.
CPC ............ *B32B 15/098* (2013.01); *B32B 15/16* (2013.01); *B32B 15/20* (2013.01); *B32B 17/061* (2013.01); *B32B 27/08* (2013.01); *B32B 27/16* (2013.01); *B32B 27/20* (2013.01); *B32B 27/42* (2013.01); *B32B 37/185* (2013.01); *B32B 43/00* (2013.01); *B44C 1/105* (2013.01); *B44C 5/0415* (2013.01); *B32B 15/04* (2013.01); *B32B 15/12* (2013.01); *B32B 27/04* (2013.01); *B32B 38/06* (2013.01); *B32B 2250/02* (2013.01); *B32B 2250/03* (2013.01); *B32B 2255/10* (2013.01); *B32B 2255/26* (2013.01); *B32B 2262/101* (2013.01); *B32B 2264/025* (2013.01); *B32B 2264/0292* (2013.01); *B32B 2305/076* (2013.01); *B32B 2307/302* (2013.01); *B32B 2307/306* (2013.01); *B32B 2309/02* (2013.01); *B32B 2309/04* (2013.01); *B32B 2309/105* (2013.01); *B32B 2309/12* (2013.01); *B32B 2311/00* (2013.01); *B32B 2311/24* (2013.01); *B32B 2333/08* (2013.01); *B32B 2375/00* (2013.01); *B32B 2379/00* (2013.01); *B32B 2451/00* (2013.01); *B32B 2605/00* (2013.01); *B32B 2605/10* (2013.01); *B32B 2605/12* (2013.01); *Y10T 428/249921* (2015.04); *Y10T 428/254* (2015.01); *Y10T 428/31605* (2015.04)

(58) Field of Classification Search
CPC ..... B32B 15/08; B32B 15/095; B32B 15/098; B32B 15/12; B32B 15/20; B32B 29/06; D21H 27/26; D21H 27/28
USPC ....... 156/60, 71, 94, 98, 196, 212, 242, 246, 156/277, 278, 307.1, 307.3, 307.5, 307.7, 156/313, 327
See application file for complete search history.

(56) References Cited

FOREIGN PATENT DOCUMENTS

| | | | |
|---|---|---|---|
| JP | 2005-246892 A | | 9/2005 |
| JP | 2008238481 A | * | 10/2008 |
| JP | 2010-228179 A | | 10/2010 |
| JP | 2011-68066 A | | 4/2011 |
| JP | 2011-79297 A | | 4/2011 |
| JP | 2011068066 A | * | 4/2011 |
| JP | 2012-131092 A | | 7/2012 |
| WO | 2012/086032 A1 | | 6/2012 |

OTHER PUBLICATIONS

Office Action dated May 27, 2015, issued in counterpart Chinese Patent Application No. 201380012531.6, w/English translation (13 pages).
International Search Report dated May 21, 2013 issued in corresponding application No. PCT/JP2013/056113.
Search Report dated Oct. 14, 2015, issued in counterpart European Application No. 13758261.5-1303 / 2823962. (5 pages).

* cited by examiner

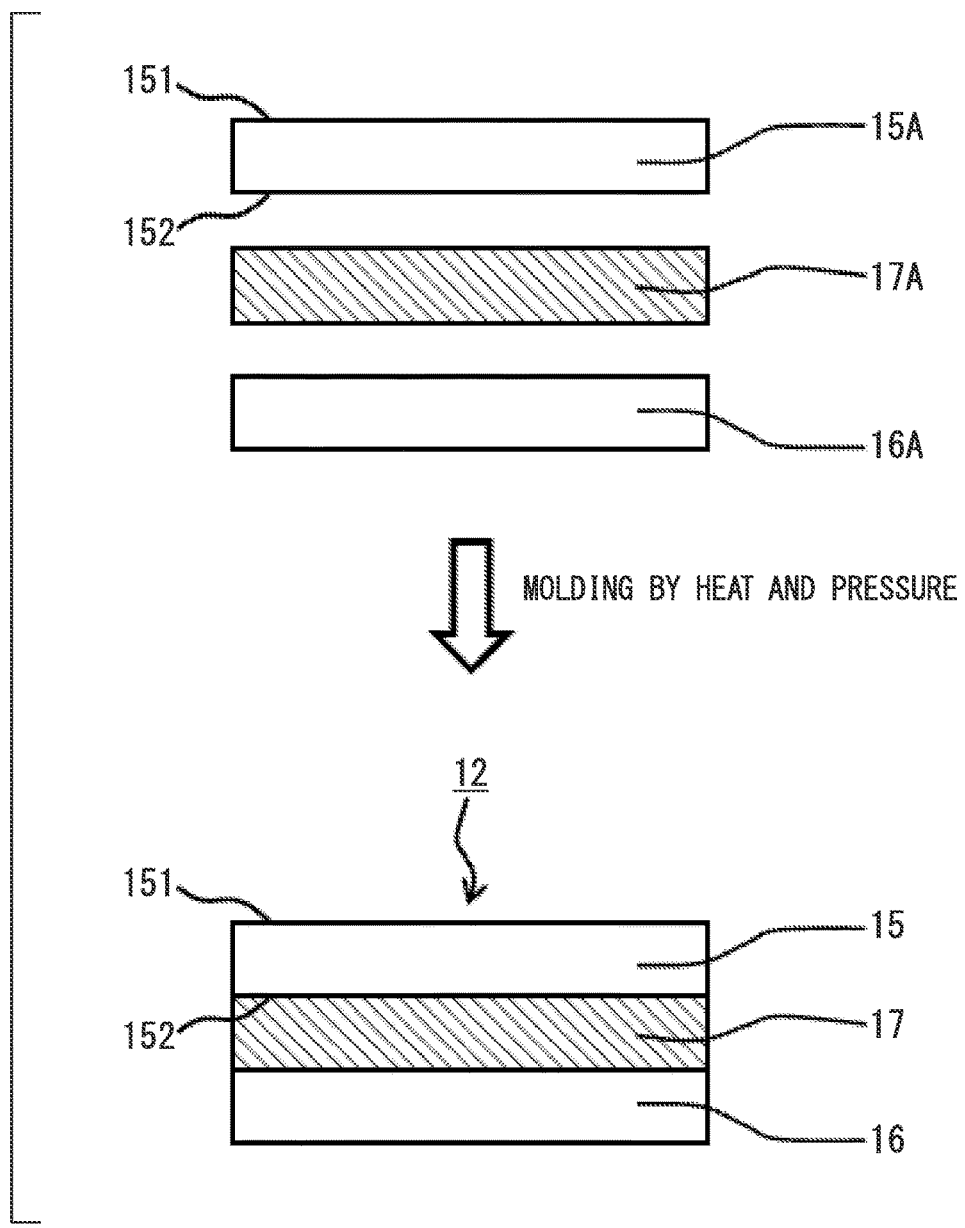

MELAMINE RESIN DECORATIVE SHEET AND METHOD OF REFURBISHING FINISHED SURFACE

TECHNICAL FIELD

The present invention relates, for example, to a melamine resin decorative sheet used in a method of refurbishing a decorative surface of a vehicle interior to make a new decoration by laminating a melamine resin decorative sheet onto a finished surface such as an existing interior decorative panel or decorative top plate of a partition plate in a railroad vehicle or the like, and a method of refurbishing a finished surface.

Priority is claimed on Japanese Patent Application No. 2012-050148, filed Mar. 7, 2012 and Japanese Patent Application No. 2013-002889, filed Jan. 10, 2013, the contents of which are incorporated herein by reference.

BACKGROUND ART

For example, as a surface decorative material of a decorative panel or a decorative top plate used in an interior of a railroad vehicle, an automobile, a ship, or the like, various materials such as different kinds of sheet bonding materials such as a vinyl chloride decorative sheet; an FRP molded article; a designable stainless steel plate; a composite material of a metal plate and a resin foam; a coated metal plate; and a melamine resin decorative sheet are generally used. Among these decorative materials, the melamine resin decorative sheet in particular is widely used as an interior material, particularly for a decorative surface of a vehicle or a ship as a material which has a hard surface, excellent heat resistance and contamination resistance, and high durability (maintenance of a beautiful appearance).

CITATION LIST

Patent Document

[Patent Document 1] Japanese Unexamined Patent Application, First Publication No. 2001-96702
[Patent Document 2] Japanese Unexamined Patent Application, First Publication No. 2005-246892

SUMMARY OF INVENTION

Technical Problem

An object to be achieved by the present invention is to provide a melamine resin decorative sheet which can utilize the high durability of a melamine resin decorative sheet and can also be used to newly decorate an existing finished surface with ease along with a high degree of non-combustibility, a low weight, reduced panel warpage, stable cracking resistance, improved reparability in terms of number of steps and time required, as well as low cost for refurbishment, and efficient reduced industrial waste; and a method of refurbishing a finished surface. Specifically, the problem described below is focused on and the present invention is invented to solve this problem.

For a surface decorative material such as the melamine resin decorative sheet in the related art, since the most important function is to maintain the design of the outside appearance, in a case where the beauty of the appearance deteriorates, the value of not only the decorative material but also the decorative panel itself in each unit deteriorates. Therefore, in the related art, in the interior of a vehicle, the life span is extended through added vehicle maintenance, and in cases where the outside appearance cannot be maintained due to long use or the like, refurbishments may be required to make a new decoration.

In this case, in the related art, the refurbishment work is conducted by replacing the decorative panel or the decorative top plate installed on a vehicle structure. However, decorative panels and decorative top plates are manufactured as a composite of various decorative materials including the melamine resin decorative sheet described above and a base core material, in which a backing material may be further added; and are used in the interior of a vehicle by incorporating various assembly parts or the like thereinto. For this reason, during replacement, it is necessary to replace a decorative panel or decorative top plate with a new one after established members such as a seat, a handrail, a baggage rack or a fixing member are detached, and thus there is a problem in that refurbishment require a large number of steps and a lot of time.

In addition, after replacement, since the whole detached decorative panel or decorative top plate is disposed of and not put to another use, waste is generated resulting in an unpleasant situation from the viewpoint of environmental conservation and waste disposal. This is particularly a problem in cases where these decorative panels or the like are complex and configured of various kinds of parts, which each have a different durability. For this reason, even in a case where only the beauty of the finished surface of the surface decorative material is deteriorated and the functions of a lot of other constituent members are still sufficiently maintained, it becomes necessary to replace the whole decorative panel, and unnecessary waste is often generated.

In a case where the decorative panel and the decorative top plate are formed from the melamine resin decorative sheet, the melamine resin decorative sheet is originally a material having high durability and has a sufficient service life as a product. On the other hand, for the interiors of vehicles which were manufactured 15 to 20 years ago, the time for refurbishment to make a new decoration is rapidly approaching, and treatment of the industrial waste generated due to this requirement for refurbishing is expected to become highly important in the future, and thus a way to handle this situation in the future has been sought.

It is possible to consider the two broadly-classified methods of reducing the amount of industrial waste, as follows. Specifically, one is a method of separating and reusing the waste components, and the other one is a method of prolonging the life of a product, that is, to lengthen the time until the product becomes waste. In this case, it can be said that reusing the waste components is suitable in view of utilizing resources efficiently. However, as a practical problem, it can be said that effective and sufficient techniques of reusing waste components has not yet been established, and require considerable cost and time. As a result, a large burden is placed on a manufacturer or a maintenance person of a railroad vehicle and thus, there is a possible situation where the burden is imposed on the users of the railroad via increases in usage fees or the like. Therefore, prolonging the life of a product is desirable method at the present time; however, in order to achieve this goal to prolong the life of a product, various difficult technical problems remain.

Firstly, laminating a decorative material on an interior material of the decorative panel or decorative top plate in order to prolong the life thereof has been considered. In fact, in particular, compared to various decorative materials of a vehicle, a melamine resin decorative sheet has excellent long-term durability and good appearance, and therefore, practical use of a melamine resin decorative sheet capable of being laminated has been required for a long time. However, there have been cases where a melamine resin decorative sheet is used as part of an interior material or an exterior material of a vehicle in which weather resistance is required for long periods of changing temperature and humidity, and which is exposed to a severe usage environment close to a semi-outdoor environment. In this case, since it is difficult to suppress panel warpage and the rate of dimensional change occurring in association with the high elastic stress that the melamine resin decorative sheet is under, it is difficult to properly laminate the melamine resin decorative sheet.

For the problem of panel warpage and dimensional change, a melamine resin decorative sheet having a small dimensional change and excellent workability at ordinary temperature has been proposed (refer to Patent Document 1). However if this melamine resin sheet was laminated on an existing decorative panel, it was difficult to meet the "non-combustibility" standard in the Material Combustion Test for Vehicles (hereinafter, simply abbreviated as "MCTV") with which the melamine resin sheet should comply, particularly when used as an interior material of a vehicle. Needless to say, even in a case where the melamine resin decorative sheet in the related art is laminated using an adhesive agent having high strength, this problem occurred in the same way.

In order to meet the "non-combustibility" standard in the MCTV, laminating an aluminum-based melamine resin metal decorative sheet (the thickness of a product is from 1.2 mm to 1.6 mm) which is an existing material having "non-combustibility" in the MCTV in itself with an adhesive agent has been considered. However, thirdly, in this method, it was very difficult to cut and process the decorative sheet in accordance with a shape of an established panel or a dimensional measurement, or to perform the bonding work at the site. As a result, since defects such as panel warpage or peeling of an adhesion surface after refurbishment is highly likely to occur despite a lot of number of steps being required, it was difficult to say that the method is a proper method.

On the other hand, a method of laminating a melamine resin decorative sheet without replacing the decorative panel itself is proposed in Patent Document 2. However, in this method, there is a limitation of non-combustibility as a simple substance, and a higher degree of non-combustibility was required for application to a vehicle, as well as for use in underground malls, public facilities and the like. In addition, requirements such as a light weight, reduced panel warpage, stable cracking resistance, and ease of installation at the site have become more demanding and there is no practical method of refurbishing a finished surface in which these requirements are satisfied.

Solution to Problem

Such an object can be achieved by any of aspects [1] to [17] of the present invention described below.

[1] A melamine resin decorative sheet including a laminate structure of a surface layer and a core layer,
in which the surface layer is configured of a surface layer material composed of a surface layer base material which carries a resin containing a melamine resin on a first surface side that serves as a design surface and which carries a solid content of a thermoplastic emulsion resin on a second surface side that contacts with the core layer, and
in which the core layer is configured of a heat dissipative material layer.

[2] The melamine resin decorative sheet according to [1], in which the heat dissipative material layer is a metallic layer.

[3] The melamine resin decorative sheet according to [2], in which the metallic layer is an aluminum layer.

[4] The melamine resin decorative sheet according to any one of [1] to [3], further including an adhesive layer between the surface layer and the core layer.

[5] The melamine resin decorative sheet according to [4], in which the adhesive layer is configured of an adhesive layer base material that carries the solid content of a thermosetting resin.

[6] The melamine resin decorative sheet according to [5], in which the adhesive layer base material is a glass cloth.

[7] The melamine resin decorative sheet according to any one of [1] to [6], in which the solid content of the thermoplastic emulsion resin includes emulsion resin particles having an average particle diameter of 30 nm to 100 nm.

[8] The melamine resin decorative sheet according to any one of [1] to [7], in which the solid content of the thermoplastic emulsion resin is water-insoluble.

[9] The melamine resin decorative sheet according to any one of [1] to [8], in which the solid content of the thermoplastic emulsion resin includes urethane acrylic composite particles having a hetero-phase structure including an acrylic resin and an urethane resin in a single particle.

[10] The melamine resin decorative sheet according to [9], in which the urethane acrylic composite particles are an aqueous clear type having a core-shell structure in which an acrylic component is set to a core and an urethane component is set to a shell.

[11] The melamine resin decorative sheet according to any one of [1] to [10], which has bending workability in which a minimum bending radius is 15 mmR or less at normal temperature (from 20° C. to 30° C.).

[12] The melamine resin decorative sheet according to [11], which has bending workability in which a minimum bending radius is 10 mmR or less at normal temperature (from 20° C. to 30° C.).

[13] A method of refurbishing a finished surface which makes a new decoration by laminating a melamine resin decorative sheet on an existing finished surface,
in which the melamine resin decorative sheet includes a laminate structure of a surface layer and a core layer,
in which the surface layer is configured of a surface layer material composed of a surface layer base material which carries a resin containing a melamine resin on a first surface side that serves as a design surface and which carries a solid content of a thermoplastic emulsion resin on a second surface side that contacts with the core layer, and
in which the core layer is configured of a heat dissipative material layer.

[14] The method of refurbishing a finished surface according to [13], in which the melamine resin decorative sheet according to any one of [1] to [12] is subjected to a defoaming treatment.

[15] The method of refurbishing a finished surface according to [14], in which a defoaming treatment is performed by one of pressurizing the finished surface using a roll after molding the melamine resin decorative sheet, and pressurizing, heating or thermally compressing the melamine resin decorative sheet after laminating the melamine resin decorative sheet on the finished surface.

[16] The method of refurbishing a finished surface according to any one of [1] to [15], in which the melamine resin decorative sheet is provided in advance with a sticking layer on a back surface.

[17] The method of refurbishing a finished surface according to any one of [1] to [16], in which the finished surface is a finished surface of an interior material or an exterior material of a vehicle or a ship.

Advantageous Effects of Invention

The present invention provides a melamine resin decorative sheet which can utilize the high durability of a melamine resin decorative sheet and can also be used to newly decorate an existing finished surface with ease and obtain a high degree of non-combustibility, a low weight, reduced panel warpage, stable cracking resistance, improved reparability in terms of number of steps and time required, as well as low cost for refurbishment, and an efficient reduction in industrial waste; and a method of refurbishing a finished surface.

BRIEF DESCRIPTION OF DRAWINGS

FIG. 6 is a diagram illustrating an example of a method of manufacturing a melamine resin decorative sheet according to a second embodiment of the present invention.

DESCRIPTION OF EMBODIMENTS

Figure 1:
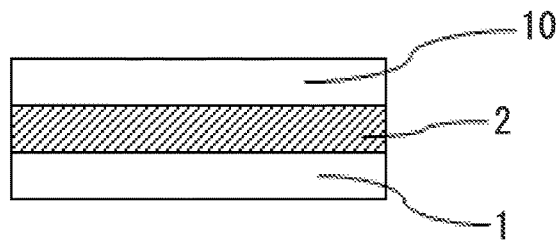
FIG. 1 is a cross-section diagram of an established decorative panel of a vehicle in which a melamine resin decorative sheet of the present invention is laminated.

A description will be provided of embodiments of the present invention with reference to drawings in detail. FIG. 1 shows a state of a method of refurbishing a finished surface using a melamine resin decorative sheet of the present invention, and the method of refurbishing is, for example, one in which a melamine resin decorative sheet 10 is laminated on a finished surface such as an established decorative panel of a vehicle 1 to newly decorate the finished surface, as shown in FIG. 1.

The melamine resin decorative sheet 10 is laminated on the finished surface of the established decorative panel of a vehicle 1 by a sticking agent such as an adhesive tape 2, as shown in FIG. 1. Moreover, for this sticking agent, it is desired to use one which is as thin as possible yet having sufficient adhesion strength so that the sticking agent does not promote ignition and inflammation by increasing the combustion temperature of a surface of combustion due to the sticking agent becoming an insulating layer during combustion and a diffusion of combustion heat being inhibited. In addition, in order to stabilize the adhesive quality, lamination of the melamine resin decorative sheet 10 is performed after stains or foreign matter attached to the finished surface of the established decorative panel of a vehicle 1 are eliminated and a primer treatment is executed, as necessary.

First Embodiment

The melamine resin decorative sheet used in a method of refurbishing a finished surface according to a first embodiment of the present invention is a melamine resin decorative sheet having a laminate structure of a surface layer and a core layer, in which the surface layer is configured of a surface layer material composed of a surface layer base material which carries a resin containing a melamine resin on a first surface side that serves as a design surface and which carries a solid content of a thermoplastic emulsion resin on a second surface side that contacts with the core layer, and in which the core layer is configured of a heat dissipative material layer.

Hereinafter, description will be provided of a melamine resin decorative sheet used in a method of refurbishing a finished surface of the present embodiment of detail, based on diagrams.

Figure 2:
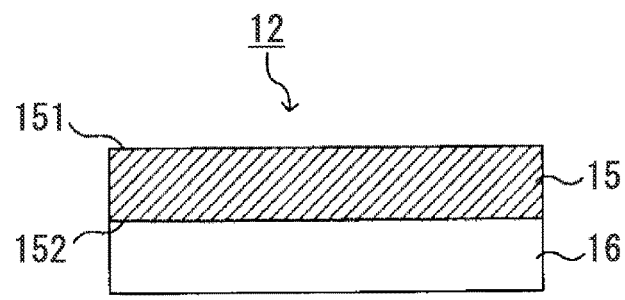
FIG. 2 is a schematic diagram showing an example of a configuration of a melamine resin decorative sheet according to a first embodiment of the present invention.
Figure 3:
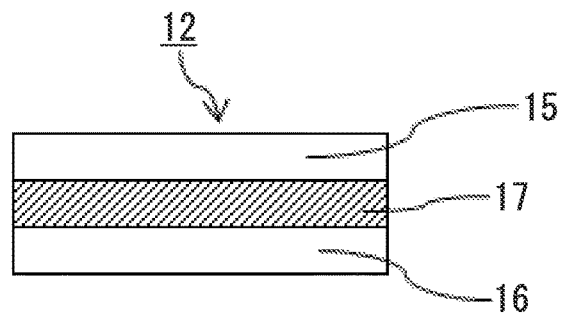
FIG. 3 is a schematic diagram showing an example of a configuration of a melamine resin decorative sheet according to a first or second embodiment of the present invention.
Figure 4:
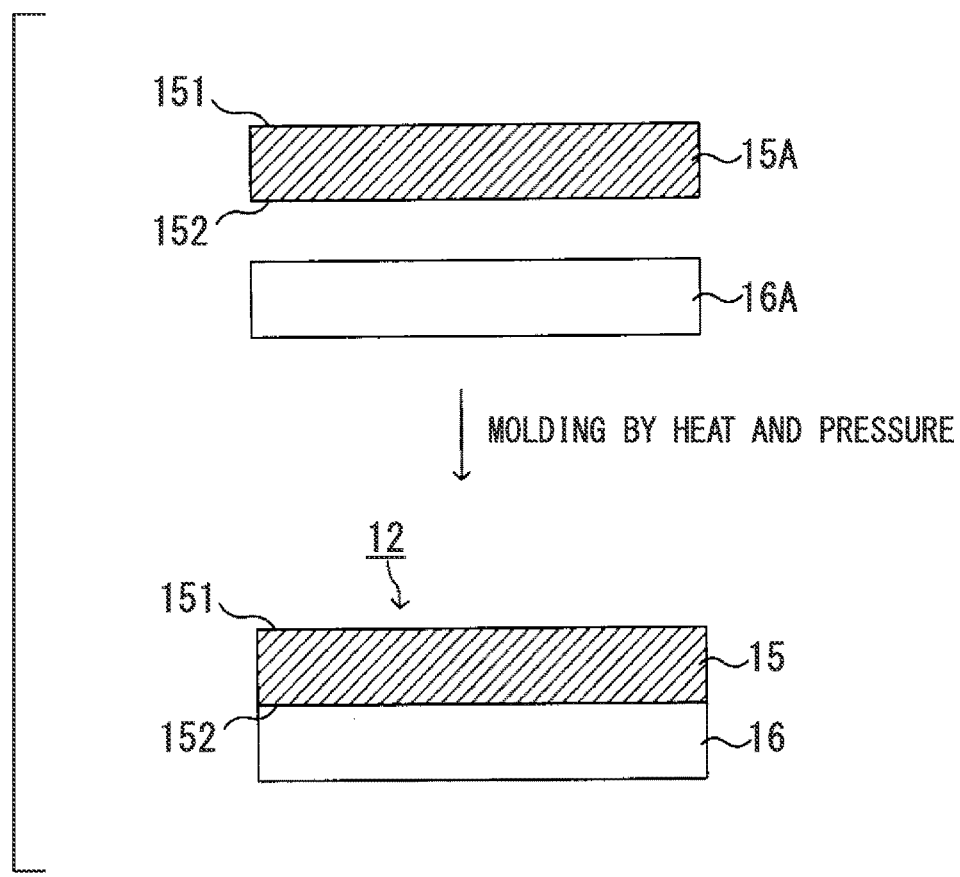
FIG. 4 is a diagram illustrating an example of a method of manufacturing a melamine resin decorative sheet according to a first embodiment of the present invention.
Figure 5:
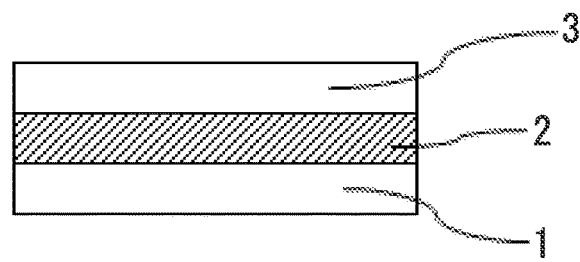
FIG. 5 is a cross-section diagram of a panel of a Comparative Example.

As an example of a configuration of a melamine resin decorative sheet of the present embodiment, a configuration of a melamine resin decorative sheet 12 consisting of a surface layer 15 and a core layer 16 is shown in FIG. 2. Moreover, the melamine resin decorative sheet 12 may have an adhesive layer 17 between the surface layer 15 and the core layer 16, as shown in FIG. 3. In addition, as an example of a method of manufacturing a melamine resin decorative sheet, a method of manufacturing the melamine resin decorative sheet 12 is shown in FIG. 4. In the example shown in FIG. 4, the melamine resin decorative sheet 12 is obtained by superimposing a surface layer material 15A and a core layer material 16A, and molding this by heat and pressure followed by lamination.

<1. Surface Layer>

The surface layer 15 is configured of the surface layer material 15A and the surface layer material 15A is arranged on a design surface (a surface of the exposed side) side of the melamine resin decorative sheet 12 of the present embodiment. The surface layer material 15A is composed of a surface layer base material which carries a resin containing a melamine resin on a first surface side 151 that serves as a design surface, and which canes a solid content of a thermoplastic emulsion resin on a second surface side 152 that contacts the core layer 16.

Moreover, in the present specification, the surface layer base material carrying a resin means that it is possible to exhibit performance of a resin carried after attaching a resin onto a surface of a base material (carrier) or impregnating a resin with a cavity part inside a base material and molding a surface layer material. Moreover, the resin may not be uniformly distributed on the surface of the base material and inside the base material.

The surface layer base material is a sheet-like base material in which the design surface is formed on the first surface side 151. The quality of material of the surface layer base material is not particularly limited, and, a pulp, a linter, a synthetic fiber, a glass fiber and the like can preferably be used, and a titanium oxide-containing decorative paper containing a pigment such as titanium oxide, or the like can be used, as necessary.

A basis weight of the surface layer base material is not particularly limited, and is preferably from 40 g/m$^2$ to 150 g/m$^2$. When the basis weight is less than the lower limit value described above, it is difficult to perform a coating treatment due to breaks and wrinkles in a resin impregnation step, and it is also difficult to adjust the amount of impregnation of the resins which are respectively carried on a first surface and a second surface. On the other hand, when the basis weight exceeds the upper limit value, an unevenness in the amount of impregnation of the resin carried by the surface layer base material occurs and the flexibility of the melamine resin decorative sheet 12 is reduced, and low productivity and high cost are caused, which is not preferable.

The surface layer material 15A used in the present embodiment is formed by carrying the resin containing the melamine resin on the first surface side 151 of the surface layer base material. It is therefore possible to impart a suitable surface hardness to the surface of the first surface side 151 of the surface layer material 15A, that is, the surface of the melamine resin decorative sheet.

The melamine resin is not particularly limited, and it is possible to use, for example, one which is obtained by reacting melamine with formaldehyde under neutral or weak alkali. The molar ratio of the reaction of formaldehyde to melamine (a value of (the molar amount of formaldehyde)/(the molar amount of melamine), hereinafter, sometimes referred to simply as a "molar ratio of the reaction") is not particularly limited, and it is possible to suitably use one which is obtained by a reaction by setting the molar ratio of the reaction to 1.0 to 4.0, preferably to 1.0 to 2.0 and more preferably to 1.1 to 1.8. When the molar ratio of the reaction is less than the lower limit value described above, since an unreacted component increases, the preservability is reduced and the cost increase, and when the molar ratio of the reaction exceeds the upper limit value described above, the flexibility of the resin is remarkably reduced after curing. Moreover, a melamine resin including one kind melamine resin can be used; and a melamine resin including a mixture of two or more melamine resins having different molar ratios in the reaction, different weight average molecular weights, or the like can also be used.

In addition, as a melamine resin, commercial ones such as a melamine resin manufactured by Sumitomo Chemical Co., Ltd. can also be used.

The weight average molecular weight of the melamine resin is not particularly limited, however, is preferably from 200 to 500 and particularly preferably from 250 to 350. When the molecular weight is lower than the lower limit value described above, the unreacted portion increases, and the preservability is reduced but when the molecular weight is higher than the upper limit value described above, the impregnation property to the base material is reduced. Moreover, the weight average molecular weight, for example, can be measured by GPC (gel permeation chromatography, standard substance: polystyrene conversion).

A method of carrying the resin containing the melamine resin on first surface side 151 of the surface layer base material is not particularly limited, and includes a method of coating a resin varnish in which the resin is dissolved in a solvent using a well-known device such as, for example, a spray device, a shower device, a kiss coater or a comma coater, and the like and then heating and drying it at approximately 80° C. to 130° C. Moreover, it is preferable that 2% by mass to 6% by mass of the volatile matter content (solvent) in the surface layer base material remain after the resin varnish is coated, and then heated and dried (hereinafter, also referred to as a resin impregnated paper) when the entire weight of resin impregnated paper is set to 100% by mass. This is because the resin impregnated paper becomes easy to handle, and the outside appearance of the design and the surface glossiness of the decorative sheet become excellent since the resin flow of the melamine resin carried on the first surface side 151 is improved in molding by heat. When the volatile matter content is less than 2%, the resin impregnated paper easily breaks and becomes difficult to be handled and a decrease in the resin flow also occurs, and thus an outside appearance formation is damaged. In addition, in a case where the volatile matter content exceeds 6%, the warpage of the decorative sheet (sheet curl) easily increases under a dry environment after molding, and when the volatile matter content is 7.5% or more, the volatile matter content begins to cause an effect on the transcription of gloss in the outside appearance of the decorative sheet.

The solvent which dissolves the resin containing the melamine resin is not particularly limited; and for example, water, methanol and the like are included. Among those, water is preferable. In addition, a poor solvent may be used as long as it has no adverse effect. The solid content of the resin varnish (all components except a solvent) is not particularly limited; and is preferably from 30% by mass to 70% by mass of the resin varnish and particularly preferably from 45% by mass to 60% by mass thereof. It is therefore possible to improve the impregnation property of the resin varnish to the base material.

For the surface layer material 15A in present embodiment, the solid content of the thermoplastic emulsion resin is carried on the second surface side 152 on the side opposite to the design surface of the surface layer base material. Moreover, the thermoplastic emulsion resin in the present invention means one which becomes an emulation state by being dispersed in a solvent containing a thermoplastic resin. In addition, the solid content of the thermoplastic emulsion resin means components in which a solvent is removed from the thermoplastic emulsion resin.

The solid content of the thermoplastic emulsion resin includes a component existing as emulsion resin particles, has adhesive characteristics with metals or various materials, and imparts the flexibility to the melamine resin decorative sheet. Therefore, it is possible to improve the adhesion strength between the surface layer 15 and the core layer 16 as well for improve the bending workability of the melamine resin decorative sheet, by the solid content of the thermoplastic emulsion resin being carried on the second surface side 152.

The solid content of the thermoplastic emulsion resin is not particularly limited, however, for example, the emulsion particles of the thermoplastic resin such as an acrylic resin, an urethane resin, a vinyl acetate-based copolymer, urethane acrylic composite particles, a styrene butadiene rubber (SBR), or a nitrile rubber (NSR) are included. Among those, urethane acrylic composite particles are preferable. The urethane acrylic composite particles in the present invention mean one having a hetero-phase structure including an acrylic resin and an urethane resin in a single particle. Since the urethane resin and the acrylic resin each have high adhesion strength with the core layer, it is possible to exhibit excellent adhesion strength with the core layer by using the urethane acrylic composite particles. Furthermore, the urethane resin is particularly excellent in toughness, elasticity and flexibility, and the acrylic resin is particularly excellent in transparency, durability, weather resistance, chemical resistance and film formability.

In addition, a "hetero-phase structure" in the present invention means a structure in which a plurality of phases consisting of different kinds of resins exist in one particle, for example, a core-shell structure, a localized structure, a sea-island structure, and the like are included. In addition, the state of array between particles when the urethane acrylic composite particles are carried on the first surface side 151 of the surface layer material 15A is not particularly limited, and for example, a linear chain structure and the like are included. For the structure in a particle and the state of array between particles, for example, it is possible to confirm by a scanning electron microscope (SEM). Among those, the urethane acrylic composite particles are particularly preferably an aqueous clear type having a core-shell structure in which an acrylic component is set to a core and an urethane component is set to a shell. If the urethane acrylic composite particles has the core-shell structure described above, when the urethane acrylic composite particles are carried on the second surface side 152 of the surface layer material 15A, the surface outline is consisted of an urethane composition, and thus, the second surface side 152 of the surface layer material 15A has both characteristics of the urethane resin and the acrylic resin as well as the characteristics of the urethane resin is imparted to the outline.

Moreover, "aqueous clear" in the present invention means a resin aqueous solution in which a resin liquid is water-soluble and a coated film after drying out water is water-insoluble, and which has the transparency of the degree capable of clearly identifying the colored design of the foundation. By the resin which is carried on the second surface side 152 of the surface layer material 15A being an aqueous clear type, it is possible to suppress an effect on the color tone on the design surface in which the surface layer has.

Moreover, as the solid content of the thermoplastic emulsion resin, one including one kind alone among those can be used and one including two or more different thermoplastic resins by mixing can also be used.

In addition, the solid content of the thermoplastic emulsion resin may include a small amount of thickening agent, penetration-enhancing agent, antifoam agent, or the like, as necessary, in addition to the emulsion particles of the thermoplastic resin.

The solid content of the thermoplastic emulsion resin preferably includes the emulsion resin particles having an average particle diameter of 30 nm to 100 nm, and the average particle diameter of the emulsion resin particles is particularly preferably from 60 nm to 90 nm. From this, since the impregnation property between fibers of the surface layer base material is improved and it is possible to impregnate more inside the surface layer base material, it is possible to impart excellent flexibility to the surface layer.

In addition, the solid content of the thermoplastic emulsion resin is preferably water-insoluble. From this, since the solid content of the thermoplastic emulsion resin is transferred to the first surface side 151 of the surface layer material 15A and mixed with the melamine resin which is carried on the first surface side 151, it is possible to prevent the surface performance of the first surface side 151 from spoiling by the melamine resin.

A method of carrying the solid content of the thermoplastic emulsion resin on the second surface side 152 of the surface layer base material is not particularly limited, and it is possible to perform in the same way as the method described above used to carry the resin containing the melamine resin on the first surface side 151 of the surface layer base material. That is, a method of coating the thermoplastic emulsion resin in the emulsion state which is dissolved in the solvent, and which is then heated and dried, and the like are included. Moreover, it is preferred to remain from 2% by mass to 6% by mass of the volatile matter content in the resin impregnated paper after being heated and dried when the entire weight of the resin impregnated paper is set to 100% by mass. From this, because the resin impregnated paper becomes easy to be handled, and the outside appearance of the design and the surface glossiness of the decorative sheet become excellent since the resin flow of the melamine resin carried on the first surface side 151 is improved during the molding by the heat.

The solvent used for the thermoplastic emulsion resin is not particularly limited, and, for example, includes water and the like. In addition, a poor solvent may be used as long as it has no adverse effect.

The solid content of the thermoplastic emulsion resin (all components except the solvent) is not particularly limited, and is preferably from 25% by mass to 60% by mass of the thermoplastic emulsion resin and is particularly preferably from 30% by mass to 45% by mass thereof. It is therefore possible to improve the impregnation property of the thermoplastic emulsion resin to the base material.

<2. Core Layer>

The melamine resin decorative sheet 12 of the present embodiment is formed by laminating the core layer 16 on the second surface side 152 of the surface layer 15.

The heat dissipative material having a thermal conductivity of 10 W/m·K or more is preferably used to form the core layer used in the present embodiment.

As a heat dissipative material having a thermal conductivity of 10 W/m·K or more, metals such as silver (420 W/m·K), copper (398), gold (320), aluminum (236), silicon (168), brass (106), iron (84) can mainly be used, and a resin sheet containing heat conductive particles such as boron nitride, or the like can also be used as long as the thermal conductivity satisfies the condition. Among those, an aluminum layer consisting of aluminum is preferably used as a core layer, in terms of thermal conductivity, workability and versatility.

An aluminum foil or an aluminum plate can be applied to the aluminum layer used here, and it is possible to impart heat resistance, non-combustibility, stiffness property or the like to the melamine decorative sheet.

The thickness of this aluminum layer is preferably set to 0.2 mm or more. It is therefore possible to impart sufficient heat resistance and non-combustibility to the decorative sheet. When the thickness of the aluminum layer becomes thinner than the lower limit value, it becomes difficult to obtain sufficient non-combustibility due to the foundation. In addition, the upper limit of the thickness is not particularly limited, and the larger the thickness is, the more the heat resistance and the non-combustibility are improved; however, since the cost increases as the thickness and the weight of the melamine decorative sheet increase, the upper limit of the thickness is preferably set in an allowable range when designing a finished-product and is preferably set to 0.5 mm or less.

The aluminum layer is preferably one in which one surface or both surfaces are subjected to the primer treatment by an epoxy resin. It is therefore possible to further enhance the adhesion strength between the surface layer material or the sticking agent and the aluminum layer.

<3. Adhesive Layer>

The adhesive layer of the melamine resin decorative sheet 12 may be between the surface layer 15 and the core layer 16.

The adhesive layer acting as an adhesive agent such as a primer, an adhesive agent, an adhesive film or glass cloth prepreg may be set to a configuration having one layer or two or more layers. The versatile ones can be used for any of those adhesive agents. In addition, although there is no adhesive effect, for example, a glass cloth can be used as one having more excellent adhesiveness than each adherend. The glass cloth has excellent adhesion to the thermoplastic emulsion resin carried on the second surface side 152 of the surface layer and the core layer which is subjected to the primer treatment, and the adhesive property is improved more than the direct contact of the second surface side of the surface layer with the core layer which is subjected to the primer treatment. It is therefore possible to strengthen the adhesive force between the surface layer and the core layer of the melamine resin decorative sheet.

The glass cloth or the glass cloth used in the prepreg base material is not particularly limited, and for example, a glass woven fabric, a glass nonwoven fabric and the like are included, and among those, a glass woven fabric is preferable in terms of non-combustibility and strength.

In addition, as a glass configuring the glass cloth, for example, E-glass, C-glass, A-glass, S-glass, D-glass, NE-glass, T-glass, H-glass and the like are included. Among those, T-glass is preferable. It is therefore possible to reduce the thermal expansion coefficient of the glass cloth.

In addition, a nonwoven fabric, a core paper, a titanium paper, a carbon fiber cloth, an aramid fiber cloth and the like may be used, in addition to the glass cloth.

The prepreg is not particularly limited, and for example, one formed by impregnating a resin composition containing the thermoplastic resin or the like into the glass cloth can be used. The resin composition is not particularly limited as long as the interlayer adhesion strength between the surface layer 15 and the core layer 16 is sufficient to form the melamine resin decorative sheet 12, and it is preferable for the amount of the solid content to be 2% by mass to 20% by mass of the thermoplastic resin, and preferably be 3% by mass to 8% by mass thereof. It is therefore possible to improve the interlayer adhesion strength between the surface layer 15 and the core layer 16 without decreasing the high non-combustibility and bending workability.

The thermoplastic resin is not particularly limited, however, for example, an acrylic resin, an urethane resin, an ethylene vinyl acetate resin, a styrene butadiene rubber (SBR) and the like are included. Among those, an acrylic resin and an urethane resin are preferable, and the thermoplastic resin preferably includes an acrylic resin and/or an urethane resin.

The prepreg can be manufactured by a well-known method in the related art, and for example, can be obtain by impregnating a varnish, in which the resin composition is dissolved in a solvent, with the same glass cloth as the glass cloth described above and then drying it.

<4. Melamine Resin Decorative Sheet>

The melamine resin decorative sheet 12 can be obtained by superimposing the surface layer material 15A and the core layer material 16A described above in the predetermined order, and by molding due to heat and pressure followed by lamination.

The conditions of molding the melamine resin decorative sheet 12 by heat and pressure are not particularly limited but, for example, a temperature of 130° C. to 150° C., a pressure of 2 MPa to 8 MPa, and a molding period of 3 minutes to 60 minutes may be used.

In addition, when the melamine resin decorative sheet 12 is molded, it is possible to obtain a mirror surface finished plate by superimposing a mirror surface finished plate on the first surface side of the surface layer material 15A and to be emboss-finished by superimposing an embossed plate, or an embossed film or the like.

The entire thickness of the melamine resin decorative sheet used in the present embodiment is preferably 0.6 mm or less and further preferably 0.5 mm or less. When the entire thickness of the melamine resin decorative sheet exceeds the upper limit value described above, it becomes difficult to perform, in particular, an outward bending process with a small radius, and it is therefore also not preferable from the viewpoint of a reduction in thickness and weight necessary for a renovated material.

Although it is possible to perform the bending process of the melamine resin decorative sheet in the present embodiment at normal temperature (usually approximately from 20° C. to 30° C.) in which a minimum bending radius is 15 mmR or less, there is no particular limitation. The minimum bending radius R means a radius R of a minimum mold in which a defect such as a crack does not occur and a 100% quality product can be obtained even if the bending process at normal temperature which is performed in one direction along a mold having a bending portion of a radius R is repeatedly conducted.

<5. Method of Refurbishing Existing Finished Surface>

The method of refurbishing the finished surface in the present embodiment is a method of newly decorating the finished surface by laminating the melamine resin decorative sheet on the existing finished surface, and the method of refurbishing is not particularly limited, and it is possible, for example, to refurbish the finished surface by a method of pressurizing, heating or thermally compressing the melamine resin decorative sheet after laminating on the finished surface the melamine resin decorative sheet which is obtained by molding with heat and pressure. In the method of refurbishing the finished surface in the present embodiment, a defoaming treatment is preferably performed by pressurizing the melamine resin decorative sheet which is obtained by molding with heat and pressure using a roll; or by pressurizing, heating or thermally compressing the melamine resin decorative sheet after laminating the melamine resin decorative sheet on the finished surface. In addition, the melamine resin decorative sheet may be provided in advance with a sticking layer on a back surface.

According to the present embodiment, as described above, the finished surface is newly decorated by laminating the melamine resin decorative sheet on the existing finished surface. For this reason, there is a practical use in which it is possible to easily refurbish the finished surface in a short period of time by putting the long-term durability and the design of the melamine resin decorative sheet to practical use without replacing the established decorative panel, and it is not necessary to dispose of wasted resources and it is possible to effectively realize environmental conservation and a reduction in industrial waste.

In addition, from the above results, according to the present embodiment, there is a practical use in which it is possible to easily and appropriately decorate the finished surface of the interior material or the exterior material of a vehicle or a ship, as described above.

Second Embodiment

The melamine resin decorative sheet used in a method of refurbishing a finished surface according to a second embodiment of the present invention is a melamine resin decorative sheet having a laminate structure of a surface layer and a core layer through an adhesive layer, in which the surface layer is configured of a surface layer material composed of a surface layer base material which carries a resin containing a melamine resin on a first surface side that serves as a design surface and which carries a solid content of a thermoplastic emulsion resin on a second surface side that contacts with the core layer, in which the adhesive layer is configured of an adhesive layer material consisting of an adhesive layer base material that carries a solid content of a thermosetting resin, and in which the core layer is configured of a heat dissipative material layer.

Hereinafter, description will be provided of a melamine resin decorative sheet used in a method of refurbishing a finished surface of the present embodiment of detail, based on diagrams.

As an example of a configuration of a melamine resin decorative sheet of the present embodiment, a configuration of a melamine resin decorative sheet 12 having a structure in which a surface layer 15 and a core layer 16 are laminated through an adhesive layer 17 is shown in FIG. 3. In addition, as an example of a method of manufacturing a melamine resin decorative sheet, an example of a method of manufacturing the melamine resin decorative sheet 12 is shown in FIG. 6. In the example shown in FIG. 6, the melamine resin decorative sheet 12 is obtained by superimposing a surface layer material 15A and a core layer material 16A through an adhesive layer material 17A, and then molding this with heat and pressure followed by lamination.

<1. Surface Layer>

The surface layer 15 is configured of the surface layer material 15A and the surface layer material 15A is arranged on a design surface (a surface of the exposed side) side of the melamine resin decorative sheet 12 of the present embodiment. The surface layer material 15A is composed of a surface layer base material which carries a resin containing a melamine resin on a first surface side 151 that serves as a design surface and which carries a solid content of a thermoplastic emulsion resin on a second surface side 152 that contacts the adhesive layer 17.

For the surface layer 15 in the second embodiment, the same surface layer as the one in the first embodiment can be used.

<2. Core Layer>

The melamine resin decorative sheet 12 in the present embodiment is formed by laminating the core layer 16 on the second surface side 152 of the surface layer 15 through the adhesive layer 17.

The heat dissipative material having a thermal conductivity of 10 W/m·K or more is preferably used for the core layer used in the present embodiment.

As a heat dissipative material having a thermal conductivity of 10 W/m·K or more, metals such as silver (420 W/m·K), copper (398), gold (320), aluminum (236), silicon (168), brass (106), iron (84) can be mainly used; and a resin sheet containing heat conductive particles such as boron nitride, or the like can also be used as long as the thermal conductivity satisfies the condition. Among those, an aluminum layer consisting of aluminum is preferably used as a core layer, in terms of thermal conductivity, workability and versatility.

An aluminum foil or an aluminum plate can be applied to the aluminum layer used here, and it is possible to impart heat resistance, non-combustibility, stiffness or the like to the melamine decorative sheet.

The thickness of this aluminum layer is preferably set to 0.2 mm or more. It is therefore possible to impart sufficient heat resistance and non-combustibility to the decorative sheet. In addition, the upper limit of the thickness is not particularly limited, and the larger the thickness is, the more the heat resistance and the non-combustibility are improved. In addition, since the cost increases as the thickness and the weight of the melamine decorative sheet increase, the upper limit of the thickness is preferably set in an allowable range when designing finished-product and is preferably set to 0.5 mm or less.

It is preferred that one surface or both surfaces of the aluminum layer be subjected to a treatment in which an oxide film is eliminated such as a sanding or a chromate treatment, or be subjected to a primer treatment. A resin used in a primer treatment is not particularly limited, and, for example, an epoxy resin-based, an urethane resin-based, a polyester resin-based, an acrylic resin-based, a mixture or a copolymer thereof, and the like are included. It is therefore possible to further improve the adhesion strength between the surface layer material or the sticking agent and the aluminum layer.

<3. Adhesive Layer>

The melamine resin decorative sheet 12 have the adhesive layer 17 between the surface layer 15 and the core layer 16.

The adhesive layer can be used by setting the adhesive layer material configured of the adhesive layer base material that carries the solid content of a thermosetting resin to a configuration having one layer or two or more layers. The thermosetting resin is not particularly limited, and a phenol resin, an epoxy resin, an oxetane resin, a (meth)acrylate resin, an unsaturated polyester resin, a diallyl phthalate resin, an urea resin, a maleimide resin and the like can be used, and among those, a phenol resin is preferable, in terms of the non-combustibility, the heat resistance and the adhesion. The adhesive layer base material is not particularly limited, however, for example, a glass cloth, a nonwoven fabric, a core paper, a titanium paper, a carbon fiber cloth, an aramid fiber cloth and the like are included, and among those, a glass cloth is preferable, in terms of non-combustibility, strength and cost.

The glass cloth is not particularly limited, and, for example, a glass woven fabric, a glass nonwoven fabric and the like can be used, and among those, a glass woven fabric is preferable in terms of non-combustibility and strength.

In addition, as a glass configuring the glass cloth, for example, E-glass, C-glass, A-glass, S-glass, D-glass, NE-glass, T-glass, H-glass and the like are included. Among those, T-glass is preferable. It is therefore possible to reduce the thermal expansion coefficient of the adhesive layer.

The amount of the thermosetting resin carried on the adhesive layer base material is not particularly limited, and preferably contains from 1% by mass to 20% by mass of a solid content in the adhesive layer, and particularly preferably contains 2% by mass to 10% by mass thereof. It is therefore possible to improve the interlayer adhesion strength between the surface layer 15 and the core layer 16 without decreasing high non-combustibility and bending workability.

The phenol resin is not particularly limited, however, for example, for example, is one which is obtained by reacting phenols with aldehydes under an alkaline or acidic catalyst and one having at least one or more phenolic hydroxyl groups in an aromatic ring can be used.

The phenol resin is not particularly limited, however, for example, a phenol resin, a cresol resin, a resorcin resin, a xylenol resin, a naphthol resin, a bisphenol A resin, an aralkyl phenol resin, a biphenylaralkyl phenol resin, a modified phenol resin by cashew nuts oil or the like having a phenolic hydroxyl group, and the like are included. In addition, various kinds of modified phenol resins such as a xylene-modified phenol resin including a substance having a phenolic hydroxyl group, an oil-modified phenol resin in which phenols are modified with a rosin, terpene oil or the like or a rubber-modified phenol resin modified with a rubber, or the like can also be used.

The method of reacting the phenols with the aldehydes is not particularly limited, and a well-known method can be employed. The molar ratio of the reaction of aldehydes to phenols (a value of (the molar amount of aldehydes)/(the molar amount of phenols)) is not particularly limited, however, it is possible to suitably use one which is obtained by reacting by preferably setting the molar ratio of the reaction from 1.0 to 2.0 and more preferably from 1.1 to 1.4. There is a possibility that the strength and the adhesive property deteriorate when the amount of aldehydes is small with respect to that of phenols and the warpage becomes bigger when the amount of aldehydes is large.

As phenols used to obtain the phenol resin, as phenols, one having a phenolic hydroxyl group in an aromatic ring is preferable, furthermore, a substituent except a phenolic hydroxyl group may be contained. For example, phenol, cresol such as o-cresol, m-cresol or p-cresol, mixed cresol, xylenol such as 2,3-xylenol, 2,4-xylenol, 2,5-xylenol, 2,6-xylenol, 3,4-xylenol or 3,5-xylenol, ethylphenol such as o-ethylphenol, m-ethylphenol or p-ethylphenol, isopropylphenol, butylphenol such as butylphenol or p-tert-butylphenol, p-tert-amyl phenol, alkylphenol such as p-octylphenol, p-nonylphenol or p-cumylphenol, halogenated phenol such as fluorophenol, chlorophenol, bromophenol or iodophenol, a monovalent phenol substitution product such as p-phenyl phenol, amino phenol, nitrophenol, dinitrophenol or trinitrophenol, a monovalent naphthol such as 1-naphthol or 2-naphthol, polyhydric phenols such as resorcin, alkyl resorcin, pyrogallol, catechol, alkyl catechol, hydroquinone, alkyl hydroquinone, phloroglucin, bisphenol A, bisphenol F, bisphenol E, bisphenol S or dihydroxy naphthalene, cashew nuts oil configured of a substance having a phenolic hydroxyl group and the like are included. They can be used alone or in combination of two or more kinds thereof. In addition, a copolymer of these phenols having a phenolic hydroxyl group with another substance which does not contain a phenolic hydroxyl group may be used. It is therefore possible to obtain a phenol resin having at least one phenolic hydroxyl groups in a molecule.

In addition, as aldehydes used to obtain the phenol resin, for example, formaldehyde, paraformaldehyde, glyoxal, trioxal, trioxane, acetaldehyde, propionaldehyde, polyoxymethylene, chloral, hexamethylenetetramine, furfural, glyoxal, n-butyraldehyde, caproaldehyde, allyl aldehyde, benzaldehyde, crotonaldehyde, acrolein, tetraoxymethylene, phenyl acetaldehyde, o-tolualdehyde, salicylaldehyde, p-xylene dimethyl ether and the like are included. They can be used alone or in combination of two or more kinds thereof.

In addition, the catalyst used to obtain the phenol resin is not particularly limited, and an acid catalyst, a base catalyst, a transition metal salt catalyst and the like are included. As an acid catalyst, for example, an inorganic acid such as a hydrochloric acid, a sulfuric acid or a phosphoric acid, or an organic acid such as an oxalic acid, a p-toluenesulfonic acid or an organic phosphonic acid can be used. In addition, as a base catalyst, for example, an alkali metal hydroxide such as sodium hydroxide, potassium hydroxide or lithium hydroxide; an alkaline earth metal hydroxide such as calcium hydroxide or barium hydroxide; amines such as ammonia or alkyl amine and the like can be used. Furthermore, as the transition metal salt catalyst, for example, zinc oxalate, zinc acetate and the like are included.

The method of carrying the solid content of the thermosetting resin on the adhesive layer base material such as a glass cloth is not particularly limited, and, for example, a method of coating the base material with the thermosetting resin which is dissolved in the solvent and then heated and dried, and the like are included. Moreover, 1% by mass to 6% by mass of the volatile matter content preferably remain in the adhesive layer material (the adhesive layer base material carrying the thermosetting resin) after being heated and dried when the entire weight of the adhesive layer material is set to 100% by mass.

The solvent used to dissolve the thermosetting resin is not particularly limited, and for example, methanol and the like are included, and a method of coating an application liquid in which the thermosetting resin is diluted by 5 times to 14 times and the solid content of the varnish is adjusted to 3% by mass to 10% by mass and the like are included. It is therefore possible to improve the impregnation property to the adhesive layer base material of the thermosetting resin.

<4. Melamine Resin Decorative Sheet>

The melamine resin decorative sheet 12 can be obtained by superimposing the surface layer material 15A and the core layer material 16A described above through the adhesive layer 17, and molding this with heat and pressure followed by lamination.

The conditions of molding the melamine resin decorative sheet 12 with heat and pressure are not particularly limited, and it is possible to conduct molding at a temperature 130° C. to 150° C., at a pressure of 2 MPa to 8 MPa for 3 to 60 minutes.

In addition, when the melamine resin decorative sheet 12 is molded, it is possible to be mirror surface-finished by superimposing a mirror surface finished plate on the first surface side of the surface layer material 15A and it is possible to be emboss-finished by superimposing an embossed plate, or an embossed film or the like.

The entire thickness of the melamine resin decorative sheet used in the present embodiment is preferably 0.6 mm or less and more preferably 0.5 mm or less. When the entire thickness of the melamine resin decorative sheet exceeds the upper limit value described above, it becomes particularly difficult to perform an outward bending process with a small radius and it is also not preferable from the viewpoint of a reduction in thickness and weight which is required for a renewed material.

Although it is possible to perform the bending process of the melamine resin decorative sheet in the present embodiment at normal temperature (usually approximately from 20° C. to 30° C.) in which the minimum bending radius is 15 mmR or less, there is no particular limitation. The minimum bending radius R means a radius R of a minimum mold in which a defect such as a crack does not occur and a 100% quality product can be obtained even if the bending process at normal temperature which is performed in one direction along a mold having a bending portion of a radius R is repeatedly conducted.

<5. Method of Refurbishing Existing Finished Surface>

A method of refurbishing the finished surface in the present embodiment is a method of newly decorating the finished surface by laminating the melamine resin decorative sheet on the existing finished surface, and the method of refurbishing is not particularly limited, and, for example, it is possible to refurbish a finished surface using a method of pressurizing, heating or thermally compressing the melamine resin decorative sheet after laminating the melamine resin decorative sheet which is obtained by molding with heat and pressure on the finished surface. In the method of refurbishing the finished surface in the present embodiment, a defoaming treatment is preferably performed by pressurizing the melamine resin decorative sheet which is obtained by molding with heat and pressure using a roll; or by pressurizing, heating or thermally compressing the melamine resin decorative sheet after laminating the melamine resin decorative sheet on the finished surface. In addition, the melamine resin decorative sheet may be provided in advance with a sticking layer on a back surface.

According to the present embodiment, as described above, the finished surface is newly decorated by laminating the melamine resin decorative sheet on the existing finished surface. For this reason, there is a practical use in which it is possible to easily decorate the finished surface in a short period of time by putting the long-term durability and the design in which the melamine resin decorative sheet has practical use without replacing the established decorative panel as well as it is not necessary to dispose of wasted resources and it is possible to effectively realize environmental conservation and a reduction in industrial waste.

In addition, from the above results, according to the present embodiment, there is a practical use in which it is possible to easily and appropriately decorate the finished surface of the interior material or the exterior material of a vehicle or a ship, as described above.

EXAMPLE

Next, a description will be provided of Examples of the present invention and some Comparative Examples which are set in order to support an effect of the present invention.

Example 1

The melamine resin decorative sheet 10 used in the present invention was formed by the following method. The titanium oxide-containing decorative paper (manufactured by Dai Nippon Printing Co., Ltd.) in which the basis weight was 80 g/m$^2$ was used as a surface layer base material, and an emulsion of urethane acrylic composite particles ("SU-100" manufactured by Chuo Rika Kogyo Co., Ltd., average particle diameter: 84 nm, dispersion medium: water) was coated on the second surface side of the titanium oxide-containing decorative paper so that the solid content thereof was 34 g/m$^2$. Subsequently, the melamine resin (the molar ratio of the reaction 1.4, the solid content of the resin 50% by mass) was coated with 50 g/m$^2$ on the first surface side (the design surface side) of the decorative paper. Afterward, the surface layer material in which the ratio of the resin was 51% and the ratio of the volatile matter content was 3% was obtained by drying using a hot air dryer at 120° C. for 90 seconds. Moreover, the melamine resin was synthesized by a method in which the temperature was raised until a boiling point to perform a reflux reaction after melamine and formalin as a raw material were put into a reaction tank at a predetermined compounding ratio and the catalyst was added, and after confirming that the dissolution of melamine was completed, the solid content of the resin was adjusted by a dewatering treatment and cooled down when the reaction reached the end point.

The primer treatment surface of an aluminum foil was superimposed on the second surface side of the surface layer material using the surface layer material obtained above and the aluminum foil having a thickness of 0.3 mm in which the surface was subjected to the primer treatment by an epoxy resin, and a sample having a thickness of 0.4 mm was obtained by molding with heat and pressure for 20 minutes at 140° C. and 8 MPa.

Next, a high sticking type acrylic-based sticking tape for structure 2 in which a polyester nonwoven fabric consisting of an ultra-lightweight and superfine fiber of the base material of 5 μm was set to a support was subjected to a laminate processing on the back surface of the molded melamine resin decorative sheet 10 having a thickness of 0.4 mm by roll pressing at a roll linear pressure of 40 N/cm to obtain the melamine resin decorative sheet 10 with paste on the back. The melamine resin decorative sheet 10 was serially pressed and bonded on a metal-based melamine resin decorative sheet (aluminum-based is 1.2 mm) having a thickness of 1.6 mm generally used as an interior material of a vehicle while being deaerated from one side with a hand roll made of a metal. After bonding, hot pressing finished was performed from the surface side so for prevent the bonded melamine resin decorative sheet 10 from being damaged, using an iron in which the surface temperature was heated up to 180° C. to 200° C. For the contact time of iron, the iron was pressed to touch the hot pressed surface for approximately 5 seconds/part to 10 seconds/part.

Example 2

The melamine resin decorative sheet 10 used in the present invention was formed by the following method.

For the surface layer base material, the surface layer material in which the ratio of the resin was 51% and the ratio of the volatile matter content was 3% was obtained in the same way as Example 1. Next, the glass cloth (manufactured by Nanya Plastics Corporation, the stock number Nanya-2116) in which the basis weight was 104 g/m$^2$ was used as an adhesive layer, and an emulsion of the urethane acrylic composite particles ("SU-100" manufactured by Chuo Rika Kogyo Co., Ltd., average particle diameter: 84 nm, dispersion medium: water) was coated using a kiss coater system so that the solid content thereof was 5 g/m$^2$. Afterward, the adhesive layer material in which the ratio of the resin was 5% and the ratio of the volatile matter content was 0.5% was obtained by drying using a hot air dryer at 120° C. for 90 seconds.

The adhesive layer material was put on the second surface side of the surface layer material, furthermore, the primer treatment surface of the aluminum foil was superimposed, using the surface layer material and the adhesive layer obtained above and the aluminum foil having a thickness of 0.3 mm in which the surface was subjected to the primer treatment by an epoxy resin, and a sample having a thickness of 0.5 mm was obtained by molding with heat and pressure for 10 minutes at 140° C. and 5 MPa.

Next, in the same way as Example 1, the melamine resin decorative sheet 10 with paste on the back surface was manufactured, and bonded to the interior material of a vehicle.

Example 3

For the surface layer base material, the surface layer material in which the amount of the resin was 51% and the amount of the volatile matter content was 3% was obtained in the same way as Example 1.

The primer treatment surface of the aluminum foil was superimposed on the second surface side of the surface layer material using the surface layer material obtained above and the aluminum foil having a thickness of 0.1 mm in which the surface was subjected to the primer treatment by an epoxy resin, and a sample having a thickness of 0.3 mm was obtained by molding with heat and pressure for 20 minutes at 140° C. and 8 MPa.

Next, in the same way as Example 1, the melamine resin decorative sheet 10 with paste on the back surface was manufactured, and bonded to the interior material of a vehicle.

Comparative Example 1

A water-soluble melamine resin for postform in which the molar ratio of formaldehyde to melamine was 1.6, the number average molecular weight was 230 and the viscosity was 40 cps/20° C. was mixed with an aqueous acrylic resin emulsion in which the solid content was 45% and the viscosity was 35 cps/20° C. at a weight ratio of 100:35, and after adjusting the viscosity to 20 cps/25° C. by water, a melanin varnish for impregnation was obtained by adding a catalyst.

The surface layer material in which the amount of the resin was 55% and the volatile matter content was 6% was obtained by impregnating this varnish with the titanium oxide-containing decorative paper (manufactured by Dai Nippon Printing Co., Ltd.) in which the basis weight was 80 g/m², and then heated and dried.

The aluminum foil was put so that the side of the surface layer material became the primer treatment surface using the surface layer material obtained above and the aluminum foil having a thickness of 0.3 mm in which the surface was subjected to the primer treatment by an epoxy resin, and a sample having a thickness of 0.5 mm was obtained by molding with heat and pressure for 10 minutes at 145° C. and 10 MPa.

Next, in the same way as Example 1, the melamine resin decorative sheet 10 with paste on the back surface was manufactured, and bonding was performed on the interior material of a vehicle.

Comparative Example 2

An olefin sheet of 0.2 mm (a vinyl chloride resin printing sheet) was used as the surface layer material and the aluminum foil was put so that the side of the surface layer material became the coated surface of the adhesive agent using the aluminum foil having a thickness of 0.3 mm in which the surface was subjected to an urethane-based adhesive agent, and a sample having a thickness of 0.5 mm by curing at 80° C. for 30 minutes was obtained.

Next, in the same way as Example 1, the melamine resin decorative sheet 10 with paste on the back surface was manufactured, and bonded to the interior material of a vehicle.

In Example 3, the thickness of aluminium was thin, the heat dissipative property was not sufficient. Therefore, in the MCTV, blistering occurs and thus, it was determined as the flame resistance.

In Comparative Example 1, as a resin carried on the second surface side of the surface layer, the melamine decorative sheet was inferior in the bending workability at normal temperature due to use of the melamine resin without using the solid content of the thermoplastic emulsion resin.

In Comparative Example 2, since olefin was used for the surface layer, the surface characteristics such as the surface hardness or the contamination resistance were inferior.

Moreover, various data was measured in conformity to the following criteria when the results shown in Table 1 were obtained.

1. Non-Combustibility Performance Test Of Construction

The non-combustibility performance test of construction was performed by the pyrogenic test and the evaluation method in (2) ii) 4. 10. 2 and the gas toxicity test and the evaluation method in 4. 10. 3 in the non-combustibility performance test and the evaluation method in 4. 10 of the operation procedure standards "the fire protection and fireproof performance test and the statement of operation procedures of the evaluation" of General Building Res. Corp.

The performance evaluation method on an authorization based on the provision in item 9 of Article 2 of the Building Standard Act (non-combustible material) is described in the items of the operation procedure standards "the fire protection and fireproof performance test and the statement of operation procedures of the evaluation".

2. Material Combustion Test for Vehicles of Railroad (MCTV)

The Material Combustion Test for Vehicles of Railroad is performed in conformity to the "Material Combustion Test for Vehicles of Railroad" which is performed pursuant to the rule of Section 83 in "Technical Regulatory Standards on Japanese Railways" (a Ministerial Ordinance of No. 151 of the Ministry of Land, Infrastructure, Transport and Tourism of Dec. 25, 2001).

3. Bending Moldability Test

The outward bending and inward bending molding were performed with 15 mmR at room temperature in conformity to the bending moldability test (A method) of JIS K6902 and the presence or absence of cracks on the surface of the decorative sheet was confirmed.

TABLE 1

| | Example 1 | Example 2 | Example 3 | Comparative Example 1 | Comparative Example 2 |
|---|---|---|---|---|---|
| First surface side of surface layer | Melamine | Melamine | Melamine | Melamine | Olefin |
| Second surface side of surface layer | Urethane acryl | Urethane acryl | Urethane acryl | | |
| Thickness of aluminum | 0.3 mm | 0.3 mm | 0.1 mm | 0.3 mm | 0.3 mm |
| Non-combustibility performance test of construction | Non-combustible | Non-combustible | Non-combustible | Non-combustible | Non-combustible |
| MCTV | Non-combustible | Non-combustible | Flame resistant | Non-combustible | Non-combustible |
| Bending moldability (15 mmR) | ○ | ○ | ○ | X | ○ |
| Pencil hardness for surface | 9H | 9H | 9H | 9H | H |
| Contamination resistance | ○ | ○ | ○ | ○ | X |

4. Pencil Hardness for Surface

The pencil hardness for surface is performed by the pencil scratch test for coated film of JIS K5401.

5. Contamination Resistance Test

The contamination resistance test is performed by the contamination resistance test (reagent A) of JIS K6902.

Example 4

The melamine resin decorative sheet was formed by the following method.

The titanium oxide-containing decorative paper (manufactured by Dai Nippon Printing Co., Ltd.) in which the basis weight was 80 g/m$^2$ was used as a surface layer base material, and an emulsion of urethane acrylic composite particles ("SU-100" manufactured by Chuo Rika Kogyo Co., Ltd., average particle diameter: 84 nm, dispersion medium: water) on the second surface side of the titanium oxide-containing decorative paper was coated so that the solid content thereof was 34 g/m$^2$. Subsequently, the melamine resin (the molar ratio of the reaction 1.4, the solid content of the resin 50% by mass) was coated with 50 g/m$^2$ on the first surface side (the design surface side) of the decorative paper. Afterward, the surface layer material in which the amount of the resin was 51% and the amount of the volatile matter content was 3% was obtained by drying using a hot air dryer at 120° C. for 90 seconds. Moreover, the melamine resin was synthesized by a method in which the temperature was raised to the boiling point of the melamine resin to perform a reflux reaction after melamine and formalin were put into a reaction tank as a raw material at a predetermined compounding ratio and the catalyst was added, and after confirming that the dissolution of melamine was completed, the solid content of the resin was adjusted by a dewatering treatment and cooled it down when the reaction reached the end point.

Next, as an adhesive layer base material, the glass cloth (manufactured by Nanya Plastics Corporation, Nanya-2116) in which the basis weight was 104 g/m$^2$ was used. The solvent in which a phenol resin (PR-204G manufactured by SUMITOMO BAKELITE CO LTD.) was diluted with a methanol solvent by 10 times was coated thereto, and when the entire weight of the adhesive layer materials after being heated and dried was set to 100% by mass by drying using a hot air dryer at 120° C. for 90 seconds, the adhesive layer material in which 3% by mass of phenol resin remained was obtained.

The adhesive layer material was put on the second surface side of the surface layer material using the surface layer material, the adhesive layer material obtained above and the aluminum foil having a thickness of 0.3 mm in which the surface was subjected to the primer treatment by an epoxy resin (Nippe power bind manufactured by NIPPON PAINT Co., Ltd.). Furthermore, the primer treatment surface of the aluminum foil was superimposed, and the melamine resin decorative sheet having a thickness of 0.5 mm was obtained by molding with heat and pressure for 10 minutes at 140° C. and 5 MPa.

Next, a high sticking type acrylic-based sticking tape for structure (WF-017 manufactured by Konishi Co., Ltd.) in which a polyester nonwoven fabric consisting of an ultra-lightweight and superfine fiber of the base material of 10 μm was set to a support was subjected to a laminate processing on the back surface of the molded melamine resin decorative sheet 10 having a thickness of 0.5 mm by roll pressing at a roll linear pressure of 40 N/cm to obtain the melamine resin decorative sheet with paste on the back. This melamine resin decorative sheet was serially pressed and bonded on a metal-based melamine resin decorative sheet (aluminum-based is 1.2 mm) having a thickness of 1.6 mm generally used as an interior material of a vehicle while being deaerated from one side with a hand roll made of a metal.

Comparative Example 3

For the surface layer material, the surface layer material in which the ratio of the resin was 51% and the ratio of the volatile matter content was 3% was obtained in the same way as Example 4. In addition, for the adhesive layer material, an adhesive layer material in which 3% by mass of phenol resin remained was obtained, when the entire weight of the adhesive layer material was set to 100% by mass in the same way as Example 4.

The adhesive layer material was superimposed on the second surface side of the surface layer material using the surface layer material and the adhesive layer obtained above and the melamine resin decorative sheet having a thickness of 0.2 mm without the core layer was obtained by molding with heat and pressure for 20 minutes at 140° C. and 8 MPa.

Next, the melamine resin decorative sheet with paste on the back surface was manufactured in the same way as Example 4, and bonded to the interior material of a vehicle.

Comparative Example 4

For the surface layer material, the surface layer material in which the amount of the resin was 51% and the amount of the volatile matter content was 3% was obtained in the same way as Example 4. The primer treatment surface of the aluminum foil was superimposed on the second surface side of the surface layer material using the obtained surface layer material and an aluminum foil having a thickness of 0.3 mm in which the surface was subjected to the primer treatment by an epoxy resin (Nippe power bind manufactured by NIPPON PAINT Co., Ltd.), and the melamine resin decorative sheet having a thickness of 0.4 mm without the adhesive layer was obtained by molding with heat and pressure for 10 minutes at 140° C. and 5 MPa.

Next, the melamine resin decorative sheet with paste on the back surface was manufactured in the same way as Example 4, and bonded to the interior material of a vehicle.

Comparative Example 5

For the surface layer material, the surface layer material in which the amount of the resin was 51% and the amount of the volatile matter content was 3% was obtained in the same way as for Example 4.

The glass cloth was put on the second surface side of the surface layer material using the surface layer material obtained above, the glass cloth (manufactured by Nanya Plastics Corporation, Nanya-2116) in which the basis weight was 104 g/m$^2$ and the aluminum foil having a thickness of 0.3 mm in which the surface was subjected to the primer treatment by an epoxy resin (Nippe power bind manufactured by NIPPON PAINT Co., Ltd.). Furthermore, the primer treatment surface of the aluminum foil was superimposed, and the melamine resin decorative sheet having a thickness of 0.5 mm which had a glass cloth layer instead of the adhesive layer was obtained by molding with heat and pressure for 20 minutes at 140° C. and 8 MPa.

Next, the melamine resin decorative sheet with paste on the back surface was manufactured in the same way as Example 4, and bonded to the interior material of a vehicle.

Comparative Example 6

A water-soluble melamine resin for postform in which the molar ratio of formaldehyde to melamine was 1.6, the number average molecular weight was 230 and the viscosity was 40 cps/20° C. was mixed with an aqueous acrylic resin emulsion in which the solid content was 45% and the viscosity was 35 cps/20° C. at a weight ratio of 100:35, and after adjusting the viscosity to 20 cps/25° C. with water, a melanin varnish used for impregnation was obtained by adding a catalyst.

After the obtained varnish was impregnated with the titanium oxide-containing decorative paper (manufactured by Dai Nippon Printing Co., Ltd.) in which the basis weight was 80 g/m² as a surface layer base material, the surface layer material in which the ratio of the resin was 55% and the ratio of the volatile matter content was 6% was obtained by drying using a hot air dryer at 120° C. for 90 seconds.

On the other hand, for the adhesive layer material, the adhesive layer material in which 3% by mass of phenol resin remained was obtained in the same way as Example 4 when the entire weight of the adhesive layer material was set to 100% by mass.

The adhesive layer material was put on the second surface side of the surface layer material using the surface layer material, the adhesive layer material obtained above, and an aluminum foil having a thickness of 0.3 mm in which the surface was subjected to the primer treatment by an epoxy resin (Nippe power bind manufactured by NIPPON PAINT Co., Ltd.). Then, the primer treatment surface of the aluminum foil was superimposed, and a melamine resin decorative sheet having a thickness of 0.5 mm in which the configuration of the resin of the surface layer was different was obtained by molding with heat and pressure for 10 minutes at 140° C. and 5 MPa.

Next, the melamine resin decorative sheet with paste on the back surface was manufactured, and bonded to the interior material of a vehicle in the same way as Example 4.

Comparative Example 7

An olefin sheet of 0.2 in mm (a vinyl chloride resin printing sheet) was used as the surface layer material, an aluminum foil having a thickness of 0.3 mm in which the surface was subjected to an urethane-based adhesive agent as the core layer material was used, the coated surface of the adhesive agent of the aluminum foil was superimposed on the surface layer material, and a resin decorative sheet having a thickness of 0.5 mm had a different surface layer material and no adhesive layer was obtained by curing at 80° C. for 30 minutes.

Next, a resin decorative sheet with paste on the back surface was manufactured in the same way as Example 4, and bonding to the interior material of a vehicle was performed.

TABLE 2

| | | Example 4 | Comparative Example 3 | Comparative Example 4 | Comparative Example 5 | Comparative Example 6 | Comparative Example 7 |
|---|---|---|---|---|---|---|---|
| Surface layer | First surface side of surface layer | Melamine | Melamine | Melamine | Melamine | Melamine | Olefin |
| | Second surface side of surface layer | Urethane acryl | Urethane acryl | Urethane acryl | Urethane acryl | Melamine | |
| Adhesive layer or GC layer | Glass cloth | Presence | Presence | Non | Presence | Presence | Non |
| | Amount of impregnation of phenol | 3% | 3% | — | 0% | 3% | Non |
| Core layer | Thickness of aluminum | 0.3 mm | Non | 0.3 mm | 0.3 mm | 0.3 mm | 0.3 mm |
| Characteristics | Boiling test | ○ | ○ | X | ○ | ○ | X |
| | Durability test at 160° C. | ○ | ○ | X | X | ○ | X |
| | MCTV | Non-combustible | Flame resistant | Non-combustible | Non-combustible | Non-combustible | Flame resistant |
| | Bending moldability test (15 R) | ○ | ○ | ○ | ○ | X | ○ |

In Example 4, excellent results were obtained in any of the boiling test, the durability test at 160° C., the MCTV and the bending moldability test.

On the other hand, in Comparative Example 3 in which there was no core layer, the heat dissipative property was not sufficient, blistering occurs in the MCTV, and thus it was determined as the flame resistance.

In addition, in Comparative Example 4 in which there were no adhesive layer and glass cloth layer, the buffer action by the adhesive layer or the glass cloth layer disappeared, and thus bulging occurred in the boiling test and the durability test at 160° C.

In addition, in Comparative Example 5 in which the glass cloth layer was included instead of the adhesive layer, the adhesion was not sufficient, and thus peeling partially occurred in the durability test at 160° C.

In addition, in Comparative Example 6 in which the thermoplastic emulsion resin is not carried on the second surface side of the surface layer, the flexibility of the surface layer was not sufficient, and thus a crack on the surface layer occurred in the bending moldability test.

In addition, in Comparative Example 7 in which melamine was not used as a surface layer material, the heat resistance and the burning resistance of the surface layer itself were not sufficient, and thus the results were inferior in the boiling test, the durability test at 160° C. and the MCTV.

Moreover, various data was measured in conformity to the following criteria when the results shown in Table 2 were obtained.

1. Boiling Test

After a specimen having 100 mm square was immersed in boiling water (100° C.) for 2 hours, the outside appearance was confirmed, and one in which bulging and peeling do not occur at all was set to A and one in which bulging and peeling occur was set to B.

2. Durability Test at 160° C.

After a specimen having 100 mm square was heated in an oven at 160° C. for 24 hours, the outside appearance was confirmed, and one in which bulging and peeling do not occur at all was set to A and one in which bulging and peeling occur was set to B.

3. Material Combustion Test for Vehicles of Railroad (MCTV)

The Material Combustion Test for Vehicles of Railroad is performed in conformity to "Material Combustion Test for Vehicles of Railroad" which is performed pursuant to the rule of Section 83 in "Technical Regulatory Standards on Japanese Railways" (a Ministerial Ordinance of No. 151 of the Ministry of Land, Infrastructure, Transport and Tourism of Dec. 25, 2001).

4. Bending Moldability Test (15R)

The outward bending and inward bending molding were performed with 15 mmR at room temperature (23° C.) in conformity to a bending moldability test (A method) of JIS K 6902 and the presence or absence of cracks on the surface of the decorative sheet was confirmed.

INDUSTRIAL APPLICABILITY

The present invention can be applied to, for example, not only refurbishing an interior material or an exterior material of a vehicle such as a railroad or an automobile in which non-combustibility is required but also to newly decorating an interior material or an exterior material of a ship or the like. In addition, a decorative sheet can be applied to a panel for decoration for refurbishment as well as to a new product.

REFERENCE SIGNS LIST

1: established decorative panel of a vehicle
2: sticking tape
3: vinyl chloride sheet
10, 12 melamine resin decorative sheet
15: surface layer
15A: surface layer material
151: first surface side
152: second surface side
16: core layer
16A: core layer material
17: adhesive layer
17A: adhesive layer material

The invention claimed is:

1. A melamine resin decorative sheet comprising:
a laminate structure of a surface layer and a core layer, and an adhesive layer between the surface layer and the core layer,
wherein the surface layer is configured of a surface layer material composed of a surface layer base material which carries a resin containing a melamine resin on a first surface side that serves as a design surface and which carries a solid content of a thermoplastic emulsion resin on a second surface side that contacts with the core layer,
wherein the core layer is configured of a heat dissipative material layer, and
wherein the adhesive layer is configured of an adhesive layer base material that carries a solid content of a thermosetting resin.

2. The melamine resin decorative sheet according to claim 1,
wherein the heat dissipative material layer is a metallic layer.

3. The melamine resin decorative sheet according to claim 2,
wherein the metallic layer is an aluminum layer.

4. The melamine resin decorative sheet according to claim 1,
wherein the adhesive layer base material is a glass cloth.

5. The melamine resin decorative sheet according to claim 1,
wherein the solid content of the thermoplastic emulsion resin includes emulsion resin particles having an average particle diameter of 30 nm to 100 nm.

6. The melamine resin decorative sheet according to claim 1,
wherein the solid content of the thermoplastic emulsion resin is water-insoluble.

7. The melamine resin decorative sheet according to claim 1,
wherein the solid content of the thermoplastic emulsion resin includes urethane acrylic composite particles having a hetero-phase structure including an acrylic resin and an urethane resin in a single particle.

8. The melamine resin decorative sheet according to claim 7,
wherein the urethane acrylic composite particles are an aqueous clear type having a core-shell structure in which an acrylic component is set to a core and an urethane component is set to a shell.

9. The melamine resin decorative sheet according to claim 1 which has bending workability in which a minimum bending radius is 15 mm or less at normal temperature from 20° C. to 30° C.

10. The melamine resin decorative sheet according to claim 9 which has bending workability in which a minimum bending radius is 10 mm or less at normal temperature from 20° C. to 30° C.

11. A method of refurbishing a finished surface which makes a new decoration by laminating a melamine resin decorative sheet on an existing finished surface,
wherein the melamine resin decorative sheet includes a laminate structure of a surface layer and a core layer, and an adhesive layer between the surface layer and the core layer,
wherein the surface layer is configured of a surface layer material composed of a surface layer base material which carries a resin containing a melamine resin on a first surface side that serves as a design surface and which carries a solid content of a thermoplastic emulsion resin on a second surface side that contacts with the core layer,
wherein the core layer is configured of a heat dissipative material layer, and wherein the adhesive layer is configured of an adhesive layer base material that carries a solid content of a thermosetting resin.

12. The method of refurbishing a finished surface according to claim 11,
wherein the melamine resin decorative sheet is provided in advance with a sticking layer on a back surface.

13. The method of refurbishing a finished surface according to claim 11, wherein the finished surface is a finished surface of an interior material or an exterior material of a vehicle or a ship.

14. A method of refurbishing a finished surface which makes a new decoration by laminating a melamine resin decorative sheet on an existing finished surface,
    wherein the melamine resin decorative sheet includes a laminate structure of a surface layer and a core layer, and an adhesive layer between the surface layer and the core layer,
    wherein the surface layer is configured of a surface layer material composed of a surface layer base material which carries a resin containing a melamine resin on a first surface side that serves as a design surface and which carries a solid content of a thermoplastic emulsion resin on a second surface side that contacts with the core layer,
    wherein the core layer is configured of a heat dissipative material layer, wherein the adhesive layer is configured of an adhesive layer base material that carries a solid content of a thermosetting resin, and
    wherein the melamine resin decorative sheet according to claim 1 is subjected to a defoaming treatment.

15. The method of refurbishing a finished surface according to claim 14,
    wherein a defoaming treatment is performed by one of pressurizing the finished surface using a roll after molding the melamine resin decorative sheet, and pressurizing, heating or thermally compressing the melamine resin decorative sheet after laminating the melamine resin decorative sheet on the finished surface.

* * * * *